US012647365B2

(12) United States Patent
Chen

(10) Patent No.: US 12,647,365 B2
(45) Date of Patent: *Jun. 2, 2026

(54) BIT INDEX EXPLICIT REPLICATION TRAFFIC ENGINEERING EGRESS PROTECTION

(71) Applicant: HUAWEI TECHNOLOGIES CO., LTD., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 327 days.

This patent is subject to a terminal disclaimer.

(21) Appl. No.: 18/318,344

(22) Filed: May 16, 2023

(65) Prior Publication Data

US 2023/0308394 A1 Sep. 28, 2023

Related U.S. Application Data

(63) Continuation of application No. PCT/US2021/056212, filed on Oct. 22, 2021.

(60) Provisional application No. 63/127,613, filed on Dec. 18, 2020.

(51) Int. Cl.
*H04L 47/125* (2022.01)
*H04L 45/28* (2022.01)

(52) U.S. Cl.
CPC ............ *H04L 47/125* (2013.01); *H04L 45/28* (2013.01)

(58) Field of Classification Search
CPC ......... H04L 45/28; H04L 45/50; H04L 45/34; H04L 45/22; H04L 47/125
See application file for complete search history.

(56) References Cited

U.S. PATENT DOCUMENTS

| | | | |
|---|---|---|---|
| 2015/0138961 A1 | 5/2015 | Wijnands | |
| 2016/0254991 A1* | 9/2016 | Eckert ..................... | H04L 45/28 |
| | | | 370/225 |
| 2018/0278470 A1* | 9/2018 | Wijnands ................ | H04L 12/18 |
| 2018/0287935 A1* | 10/2018 | Wang .................. | H04L 12/4625 |

(Continued)

FOREIGN PATENT DOCUMENTS

| | | |
|---|---|---|
| CN | 109660460 A | 4/2019 |
| EP | 3429143 B1 | 2/2020 |

OTHER PUBLICATIONS

Litkowski, S., Bashandy, A., Filsfils, C., Decraene, B., and D. Voyer, "Topology Independent Fast Reroute using Segment Routing", draft-ietf-rtgwg-segment-routing-ti- lfa-05, Nov. 2020, 25 pages.

(Continued)

*Primary Examiner* — Awet Haile
(74) *Attorney, Agent, or Firm* — Conley Rose, P.C.

(57) ABSTRACT

A method implemented by a network node in a Bit Index Explicit Replication Traffic Engineering (BIER-TE) domain is used to provide fast egress protection. The method includes receiving a type length value (TLV) structure that includes a bit position of a backup egress node for a primary egress node, generating an egress protection bit index forwarding table (EP-BIFT) including the backup path to the backup egress node based on the bit position of the backup egress node when the network node neighbors the primary egress node, and forwarding a packet in accordance with the EP-BIFT when the primary egress node has failed.

20 Claims, 8 Drawing Sheets

300

| | Bit Position (SI:BitString) | Action | BFR-NBR (Next Hop) | BEA | SC | Backup Path |
|---|---|---|---|---|---|---|
| | *302* | *304* | *306* | *308* | *310* | *312* |
| 314 | 13' (8:00100) | fw-connected | G | | | |
| 316 | 9' (7:01000) | fw-connected | C | | | |
| 318 | 4 (0:01000) | Local-decap | H | | | |
| 320 | 1 (0:00001) | nop | | 0 | 0 | CE1 |

(56) References Cited

U.S. PATENT DOCUMENTS

2019/0116114 A1* 4/2019 Chen ...................... H04L 45/24
2022/0150155 A1* 5/2022 Xiong ................... H04L 45/745

OTHER PUBLICATIONS

Eckert, T., Cauchie, G., Braun, W., and M. Menth, "Protection Methods for BIER-TE", draft-eckert-bier-te- frr-03, Mar. 2018, 16 pages . . . .

Hegde, S., Bowers, C., Litkowski, S., Xu, X., and F. Xu, "Segment Protection for SR-TE Paths", draft-ietf-spring-segment-protection-sr-te-paths-00, Sep. 2020, 19 pages.

Atlas, Ed., et al., "Basic Specification for IP Fast Reroute: Loop-Free Alternates," RFC 5286, Sep. 2008, 31 pages.

Berger, et al., "The OSPF Opaque LSA Option," RFC 5250, Jul. 2008, 17 pages.

Bradner, "Key Words for Use in RFCs to Indicate Requirement Levels," RFC 2119, Mar. 1997, 3 pages.

Bryant, et al., "Remote Loop-Free Alternate (LFA) Fast Reroute (FRR)," RFC 7490, Apr. 2015, 29 pages.

Eckert, et al., "Tree Engineering for Bit Index Explicit Replication (BIER-TE)," draft-ietf-bier-te-arch-09, Oct. 30, 2020, 48 pages.

Ginsberg, Ed., et al., "Bit Index Explicit Replication (BIER) Support via IS-IS," RFC 8401, Jun. 2018, 12 pages.

Ginsberg, et al., "IS-IS Flooding Scope Link State PDUs (LSPs)," RFC 7356, Sep. 2014, 23 pages.

Hegde, et al., "Segment Protection for SR-TE Paths," draft-ietf-spring-segment-protection-sr-te-paths-00, Sep. 2020, 19 pages.

Karan, et al., "Multicast-Only Fast Reroute," RFC 7431, Aug. 2015, 14 pages.

Katz, et al., "Bidirectional Forwarding Detection (BFD)," RFC 5880, Jun. 2010, 49 pages.

Leiba, "Ambiguity of Uppercase vs Lowercase in RFC 2119 Key Words," RFC 8174, May 2017, 4 pages.

Lindem, Ed., et al., "Extensions to OSPF for Advertising Optional Router Capabilities," RFC 7770, Feb. 2016, 15 pages.

Litkowski, et al., "Topology Independent Fast Reroute using Segment Routing," draft-ietf-rtgwg-segment-routing-ti-lfa-05, Nov. 15, 2020, 26 pages.

Narten, et al., "Guidelines for Writing an IANA Considerations Section in RFCs", RFC 5226, May 2008, 27 pages.

Psenak, Ed., et al., "OSPFv2 Extensions for Bit Index Explicit Replication (BIER)," RFC 8444, Nov. 2018, 12 bages.

Psenak, et al., "OSPFv2 Prefix/Link Attribute Advertisement," RFC 7684, Nov. 2015, 15 pages.

Rosen, Ed., et al., "Multicast VPN Using Bit Index Explicit Replication (BIER)," RFC 8556, Apr. 2018, 17 pages.

Shand, et al., "IP Fast Reroute Framework," RFC 5714, Jan. 2010, 15 pages.

Wijnands, Ed., et al., "Multicast Using Bit Index Explicit Replication (BIER)," RFC 8279, Nov. 2017, 43 pages.

Wijnands, Ed., et al., "Encapsulation for Bit Index Explicit Replication (BIER) in MPLS and Non-MPLS Networks," RFC 8296, Jan. 2018, 24 pages.

* cited by examiner

200

| Bit Position (SI:BitString) | Action | BFR-NBR (Next Hop) | BEA | SC | Backup Path |
|---|---|---|---|---|---|
| 18' (9:00100) | fw-connected | D | 0 | 0 | C→H:{10',1} |
| 12' (8:00010) | fw-connected | F | 0 | 1 | C→E:{3',2',3} |
| 10' (7:10000) | fw-connected | H | 0 | 0 | C→D:{18',4} |
| 3' (6:00100) | fw-connected | B | 0 | | Null (B is not BEFR) |

| Bit Position (SI:BitString) | Action | BFR-NBR (Next Hop) | BEA | SC | Backup Path |
|---|---|---|---|---|---|
| 13' (8:00100) | fw-connected | G | | | |
| 9' (7:01000) | fw-connected | C | | | |
| 4 (0:01000) | Local-decap | H | | | |
| 1 (0:00001) | nop | | 0 | 0 | CE1 |

On PLR:
For BFR-NBR N as egress encoded in a packet,
IF (BEA == 1) // Primary Egress N fails and protected
     clears BP for adjacency to N and BP for BFER for BFER N,
     If BP for N's backup egress B in packet == 0 OR SC == 0,
        Adds BPs for backup path into BitString of packet copy
        and sends the packet copy to B along backup path.

On Backup Egress:
For primary egress encoded in a packet,
IF (BEA == 1) // Primary Egress fails and protected
     Sends packet's payload to CE receiver

```
Packet = the packet received by BFR;
For each BP k (from the rightmost in Packet's BitString)  {
    If (BP k is local decap adjacency)    {
        If BEA == 1 { // On backup egress and primary egress failed
            sends payload of packet to CE}
        ELSE {
            copies Packet, sends the copy to the multicast flow overlay}
        clears bit k in Packet's BitString
        } ELSE IF (BP k is forward connect adjacency of the BFR) {
            finds the forwarding entry in the EP BIFT for the domain
            using BP k
            IF (BEA ==1)  {//On PLR and BFR-NBR as Primary Egress failed
                Clears BP k and BP for BFR-NBR in Packet's BitString
                If (BP for backup egress is 0 in Packet's BitString OR SC ==0) {
                    Adds BPs for backup path into Packet's BitString;}
            } //egress removed, backup path to backup egress added
            ELSE {
                Copies Packet, updates the copy's BitString by
                clearing all the BPs for the adjacencies of the BFR,
                and sends the updated copy to the BFR-NBR
        }
    }
}
```

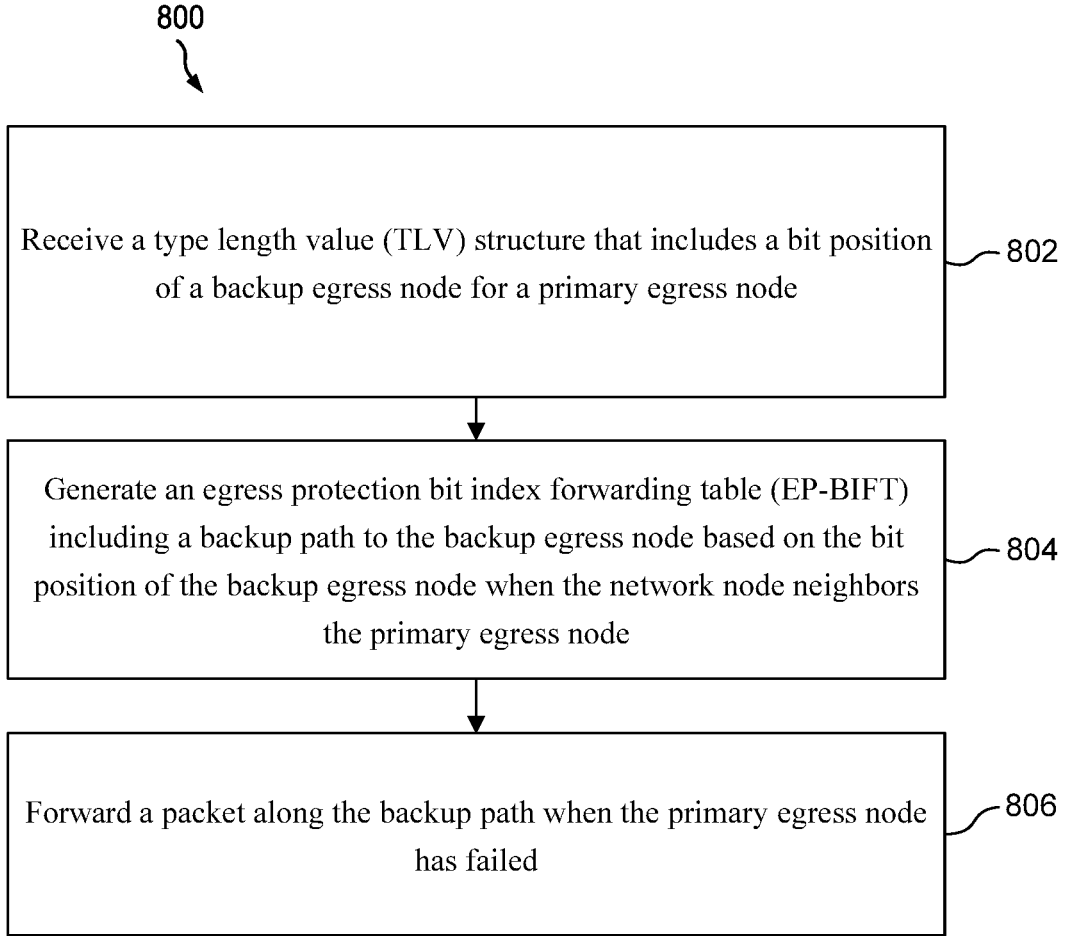

Receive a type length value (TLV) structure that includes a bit position of a backup egress node for a primary egress node ⌐ 802

Generate an egress protection bit index forwarding table (EP-BIFT) including a backup path to the backup egress node based on the bit position of the backup egress node when the network node neighbors the primary egress node ⌐ 804

Forward a packet along the backup path when the primary egress node has failed ⌐ 806

BIT INDEX EXPLICIT REPLICATION TRAFFIC ENGINEERING EGRESS PROTECTION

CROSS-REFERENCE TO RELATED APPLICATIONS

This patent application is a continuation of International Application No. PCT/US2021/056212 filed on Oct. 22, 2021, by Futurewei Technologies, Inc., and titled "Bit Index Explicit Replication Traffic Engineering Egress Protection," which claims the benefit of U.S. Provisional Patent Application No. 63/127,613 filed Dec. 18, 2020 by Huaimo Chen and titled "BIER-TE Egress Protection," which is hereby incorporated by reference.

TECHNICAL FIELD

The present disclosure is generally related to the field of egress protection and, in particular, to egress protection against the failure of a node or link in a Bit Index Explicit Replication-Traffic Engineering (BIER-TE) domain.

BACKGROUND

BIER mechanisms provide optimized forwarding of multicast data packets through a BIER domain. BIER domains may not require the use of a protocol for explicitly building multicast distribution trees. Further, BIER domains may not require intermediate nodes to maintain any per-flow state. BIER is described in further detail in Internet Engineering Task Force (IETF) document Request for Comments (RFC) 8279 entitled "Multicast Using Bit Index Explicit Replication (BIER)" by I J. Wijnands, et al., published November 2017.

Traffic Engineering (TE) is the process of steering traffic across to a telecommunications network to facilitate efficient use of available bandwidth between a pair of routers. Bit Index Explicit Replication (BIER) Traffic/Tree Engineering (BIER-TE) is described in IETF document "Tree Engineering for Bit Index Explicit Replication (BIER-TE)" by T. Eckert, et al., published Jul. 9, 2021.

SUMMARY

The disclosed aspects/embodiments provide a fast egress protection (EP) for a BIER-TE domain. To facilitate the fast egress protection procedure, a network node upstream of an egress node builds an egress protection bit index forwarding table (EP-BIFT). The EP-BIFT is used by the network node to forward packets when the egress node has failed. Therefore, packet routing within the BIER-TE domain is improved.

A first aspect relates to a method implemented by a network node in a Bit Index Explicit Replication Traffic Engineering (BIER-TE) domain, comprising: receiving a type length value (TLV) structure that includes a bit position of a backup egress node for a primary egress node; generating an egress protection bit index forwarding table (EP-BIFT) including the backup path to the backup egress node based on the bit position of the backup egress node when the network node neighbors the primary egress node; and forwarding a packet along the backup path when the primary egress node has failed.

Optionally, in any of the preceding aspects, another implementation of the aspect provides that the TLV structure is received from the primary egress node or a neighbor network node.

Optionally, in any of the preceding aspects, another implementation of the aspect provides that the TLV structure includes an entry that indicates whether the primary egress node and the backup egress node transmit the packet to a same customer edge (CE) receiver or to different CE receivers.

Optionally, in any of the preceding aspects, another implementation of the aspect provides that the EP-BIFT includes an entry that indicates whether the primary egress node and the backup egress node transmit the packet to a same customer edge (CE) receiver or to different CE receivers, and wherein the entry is disposed in a same CE receiver (SC) field in the EP-BIFT.

Optionally, in any of the preceding aspects, another implementation of the aspect provides that the EP-BIFT includes a backup entry active (BEA) field, and wherein an entry in the BEA field is set to indicate whether the primary egress node is working or has failed.

Optionally, in any of the preceding aspects, another implementation of the aspect provides that the backup egress node is identified in a backup path field in the EP-BIFT.

Optionally, in any of the preceding aspects, another implementation of the aspect provides generating the EP-BIFT includes generating the backup path in a backup path field, wherein the backup path includes a bit position of a forward connected adjacency to an intermediate node along the backup path to the backup egress node and the bit position of the backup egress node for the primary egress node when the primary egress node and the backup egress node transmit the packet to a same customer edge (CE) receiver.

Optionally, in any of the preceding aspects, another implementation of the aspect provides that generating the EP-BIFT includes generating the backup path in a backup path field, wherein the backup path includes a bit position of a forward connected adjacency to an intermediate node along the backup path to the backup egress node and a bit position of the primary egress node when the primary egress node and the backup egress node transmit the packet to different customer edge (CE) receivers.

A second aspect relates to a network node in a Bit Index Explicit Replication Traffic Engineering (BIER-TE) domain, comprising: a memory storing instructions; and one or more processors coupled to the memory, wherein the one or more processors are configured to execute the instructions to cause the network node to: receive a type length value (TLV) structure that includes a bit position of a backup egress node for a primary egress node; generate an egress protection bit index forwarding table (EP-BIFT) including the backup path to the backup egress node based on the bit position of the backup egress node when the network node neighbors the primary egress node; and forward a packet along the backup path when the primary egress node has failed.

Optionally, in any of the preceding aspects, another implementation of the aspect provides that the TLV structure is received from the primary egress node or a neighbor network node.

Optionally, in any of the preceding aspects, another implementation of the aspect provides that the TLV structure includes an entry that indicates whether the primary egress node and the backup egress node transmit the packet to a same customer edge (CE) receiver or to different CE receivers.

Optionally, in any of the preceding aspects, another implementation of the aspect provides that the EP-BIFT includes an entry that indicates whether the primary egress node and the backup egress node transmit the packet to a same customer edge (CE) receiver or to different CE receivers, and wherein the entry is disposed in a same CE receiver (SC) field in the EP-BIFT.

Optionally, in any of the preceding aspects, another implementation of the aspect provides that Optionally, in any of the preceding aspects, another implementation of the aspect provides that the EP-BIFT includes a backup entry active (BEA) field, and wherein an entry in the BEA field is set to indicate whether the primary egress node is working or has failed.

Optionally, in any of the preceding aspects, another implementation of the aspect provides that the backup egress node is identified in a backup path field in the EP-BIFT.

Optionally, in any of the preceding aspects, another implementation of the aspect provides generating the EP-BIFT includes generating the backup path in a backup path field, wherein the backup path includes a bit position of a forward connected adjacency to an intermediate node along the backup path to the backup egress node and the bit position of the backup egress node for the primary egress node when the primary egress node and the backup egress node transmit the packet to a same customer edge (CE) receiver.

Optionally, in any of the preceding aspects, another implementation of the aspect provides generating the EP-BIFT includes generating the backup path in a backup path field, wherein the backup path includes a bit position of a forward connected adjacency to an intermediate node along the backup path to the backup egress node and a bit position of the primary egress node when the primary egress node and the backup egress node transmit the packet to different customer edge (CE) receivers.

A third aspect relates to a method implemented by a network node in a Bit Index Explicit Replication Traffic Engineering (BIER-TE) domain, comprising: generating a type length value (TLV) structure, wherein the TLV structure includes a bit position of a backup egress node for a primary egress node; and transmitting the TLV structure to a neighbor network node of the primary egress node.

Optionally, in any of the preceding aspects, another implementation of the aspect provides that the TLV structure is an open shortest path first (OSPF) backup egress TLV.

Optionally, in any of the preceding aspects, another implementation of the aspect provides that the TLV structure is an intermediate system-intermediate system (IS-IS) backup egress TLV.

Optionally, in any of the preceding aspects, another implementation of the aspect provides that the TLV structure includes an entry that indicates whether the primary egress node and the backup egress node transmit a packet to a same customer edge (CE) or to different customer edges (CEs).

A fourth aspect relates to network node in a Bit Index Explicit Replication Traffic Engineering (BIER-TE) domain, comprising: receiving means configured to receive a type length value (TLV) structure that includes a bit position of a backup egress node for a primary egress node; generating means configured to generate an egress protection bit index forwarding table (EP-BIFT) including the backup path to the backup egress node based on the bit position of the backup egress node when the network node neighbors the primary egress node; and forwarding means configured to forward a packet along the backup path when the primary egress node has failed.

A fifth aspect relates to a network node in a Bit Index Explicit Replication Traffic Engineering (BIER-TE) domain, comprising: generating means configured to generate a type length value (TLV) structure, wherein the TLV structure includes a bit position of a backup egress node for a primary egress node; and transmitting means configured to transmit the TLV structure to a neighbor network node of the primary egress node.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a schematic diagram of an egress protection bit index forwarding table (EP-BIFT) of a network node according to an embodiment of the disclosure.

FIG. 3 is a schematic diagram of an EP-BIFT of a backup egress node according to an embodiment of the disclosure.

FIG. 6 is an algorithm used to implement a portion of the forwarding procedure using the EP-BIFT according to an embodiment of the disclosure.

FIG. 7 is an algorithm used to implement a portion of the forwarding procedure using the EP-BIFT according to an embodiment of the disclosure.

FIG. 8 is a method implemented by a network node in the BIER-TE domain according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Currently, there are no techniques for the fast protection against failure of an egress node in a BIER-TE domain. Therefore, a customer edge (CE) receiver will not receive a requested packet when the egress node in the BIER-TE domain fails.

Disclosed herein is a fast egress protection (EP) for a BIER-TE domain. To facilitate the fast egress protection procedure, a network node upstream of an egress node builds an egress protection bit index forwarding table (EP-BIFT). The EP-BIFT is used by the network node to forward packets when the egress node has failed. Therefore, packet routing within the BIER-TE domain is improved.

Figure 1:
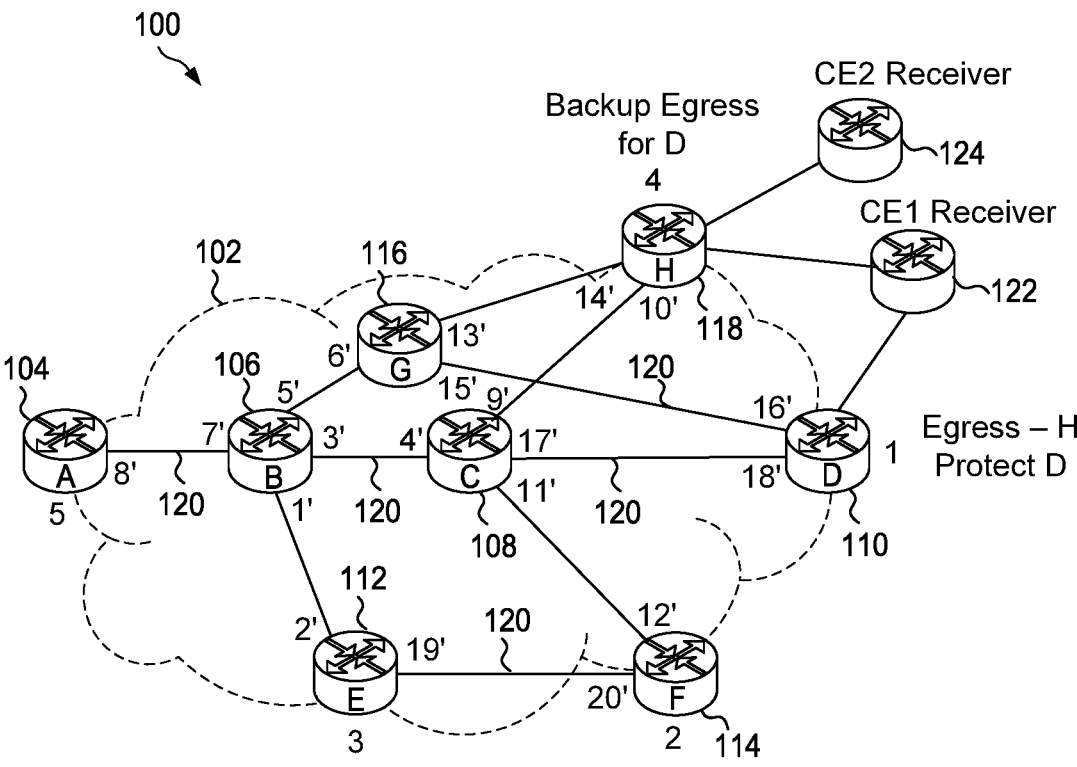
FIG. 1 is a schematic diagram of a BIER-TE topology including a BIER-TE domain.

FIG. 1 is a schematic diagram of a BIER-TE topology 100 including a BIER-TE domain 102. The BIER-TE domain 102 may be part of a larger BIER-TE domain (not shown). As such, the BIER-TE domain 102 may be referred to herein as a BIER-TE sub-domain. The BIER-TE domain 102 comprises a plurality of network nodes 104, 106, 108, 110, 112, 114, 116, and 118. While eight network nodes 104-118 are shown in the BIER-TE domain 102, more or fewer nodes may be included in practical applications.

For case of discussion, all of the network nodes 104-118 have been given a letter designation. For example, the network node 104 has the designation A, the network node 106 has the designation B, the network node 108 has the designation C, the network node 110 has the designation D, the network node 112 has the designation E, the network node 114 has the designation F, the network node 116 has the designation G, and the network node 118 has the designation H.

Each of the network nodes 104-118 is a bit forwarding router (BFR). Some of the network nodes, namely the network nodes 104, 110, 112, 114 and 118, are disposed at an edge of the BIER-TE domain 102. The network nodes 104, 110, 112, 114 and 118 receiving multicast packets from outside the BIER-TE domain 102 may be referred to as an ingress BFR (BFIR). The network nodes 104, 110, 112, 114 and 118 transmitting multicast packets out of the BIER-TE domain 102 may be referred to as an egress BFR (BFER). Depending on the direction of multicast packet traffic, each of the network nodes 104-118 may function as a BFIR or a BFER.

As shown in FIG. 1, the bit position (BP) for forward connected (fw-con) adjacency between the various network nodes 104-118 is identified. In the illustrated example, the BP for a fw-con adjacency is represented as i', where i is an integer corresponding to one of the forward adjacencies between the network nodes 104-118 in the BIER-TE domain 102. In the illustrated embodiment of FIG. 1, there are twenty total BPs for twenty fw-con adjacencies. However, there may be more or fewer BPs for fw-con adjacencies in other BIER-TE domains in practical applications.

As an example of how the BPs for fw-con adjacencies operate with regard to FIG. 1. 7' is the BP for the fw-con adjacency from node 104 to node 106, and 8' is the BP for the fw-con adjacency from node 106 to node 104. 7' is configured on the link from node 104 to node 106 and advertised to all the network nodes in the network. 8' is configured on the link from node 106 to node 104 and advertised to all the network nodes in the network. As another example, 18' is the BP for the fw-con adjacency from node 108 to node 110, and 17' is the BP for the fw-con adjacency from node 110 to node 108. 18' is configured on the link from node 108 to node 110 and advertised to all the network nodes in the network. 17' is configured on the link from node 110 to node 108 and advertised to all the network nodes in the network. Similarly, 10' is the BP for the fw-con adjacency from node 108 to node 118, and 9' is the BP for the fw-con adjacency from node 118 to node 108. 10' is configured on the link from node 108 to node 118 and advertised to all the network nodes in the network. 9' is configured on the link from node 118 to node 108 and advertised to all the network nodes in the network. The other BPs for fw-con adjacencies may be determined in a similar fashion as represented by the various values for i' on FIG. 1. For case of discussion, each BP for fw-con adjacency may be simply referred to herein as the BP or the adjacency.

Each of the network nodes 104, 110, 112, 114 and 118 may be referred to herein as a destination network node or egress BFER (BFER). The network nodes 104, 110, 112, 114 and 118 have each been assigned a BP, a set index (SI), and a bitstring. The BP of a BFER is called a local decapsulation (decap) adjacency or local decap BP. In the illustrated example, the BP of a BFER is represented as j, where j is an integer corresponding to one of the local decap adjacencies in the BIER-TE domain 102. In the illustrated embodiment of FIG. 1, there are five local decap adjacencies for five BFERs 104, 110, 112, 114 and 118. As an example, the BPs of BFERs 104, 110, 112, 114 and 118 are 5, 1, 3, 2 and 4 respectively. For simplicity, these BPs for local decap adjacencies are represented by (SI:BitString), where SI=0 and BitString is of 5 bits. BPs 1, 2, 3, 4, and 5 are collectively represented by 1 (0:00001), 2 (0:00010), 3 (0:00100), 4 (0:01000) and 5 (0:10000) respectively. The BP of a BFER is advertised by the BFER to all the nodes in the network.

In an embodiment, the BPs for fw-con adjacencies are represented by (SI:BitString), where SI>=6 and BitString is of 5 bits. For example, the BP of 3' has a SI of 6, and has a bitstring of 00100 (collectively represented by 3' (6:00100)). Assuming the SI of 6 corresponds to the first set of five BPs for fw-con adjacencies, the BP of 3' corresponds to the third bit in the bitstring from the right set to one. That is, when the SI is 6, the BP of 1' corresponds to the first bit set to one, the BP of 2' corresponds to the second bit set to one, the BP of 3' corresponds to the third bit set to one, the BP of 4' corresponds to the fourth bit set to one, and the BP of 5' corresponds to the fifth bit set to one.

Assuming the SI of 7 corresponds to the second set of five BPs for fw-con adjacencies immediately following the first set of five BPs for fw-con adjacencies, the BPs of 6', 7', 8', 9' and 10' are collectively represented by 6' (7:00001), 7' (7:00010), 8' (7:00100), 9' (7:01000) and 10' (7:10000) respectively. That is, when the SI is 7, the BP of 6' corresponds to the first bit set to one, the BP of 7' corresponds to the second bit set to one, the BP of 8' corresponds to the third bit set to one, the BP of 9' corresponds to the fourth bit set to one, and the BP of 10' corresponds to the fifth bit set to one.

Assuming the SI of 8 corresponds to the third set of five BPs for fw-con adjacencies immediately following the second set of five BPs for fw-con adjacencies, the BPs of 11', 12', 13', 14' and 15' are collectively represented by 11' (8:00001), 12' (8:00010), 13' (8:00100), 14' (8:01000) and 15' (8:10000) respectively. That is, when the SI is 8, the BP of 11' corresponds to the first bit set to one, BP of 12' corresponds to the second bit set to one, the BP of 13' corresponds to the third bit set to one, the BP of 14' corresponds to the fourth bit set to one, and the BP of 15' corresponds to the fifth bit set to one.

Assuming the SI of 9 corresponds to the fourth set of five BPs for fw-con adjacencies immediately following the third set of five BPs for fw-con adjacencies, the BPs of 16', 17', 18', 19' and 20' are collectively represented by 16' (9:00001), 17' (9:00010), 18' (9:00100), 19' (9:01000) and 20' (9:10000) respectively. That is, when the SI is 9, the BP of 16' corresponds to the first bit set to one, the BP of 17' corresponds to the second bit set to one, the BP of 18' corresponds to the third bit set to one, the BP of 19' corresponds to the fourth bit set to one, and the BP of 20' corresponds to the fifth bit set to one.

Each of the network nodes 104-118 has one or more neighbor nodes. As used herein, a neighbor node refers to a network node that is only one hop away from the network node. For example, network node 106 has four neighbor nodes in FIG. 1, namely network node 104, network node 108, network node 112, and network node 116. Indeed, each of network node 104, network node 108, network node 112, and network node 116 is only one hop away from network node 106.

The network nodes 104-118 in FIG. 1 are coupled to, and communicate with each other, via links 120. The links 120 may be wired, wireless, or some combination thereof. In an embodiment, each of the links 120 may have a cost. The cost of each of the links 120 may be the same or different, depending on the BIER-TE network and conditions therein.

The network node 110 may be referred to herein as a primary egress node (or simply an egress node), and the network node 118 may be referred to herein as a backup egress node for the primary egress node 110. As shown, the network node 110 and the network node 118 are each coupled to a first customer edge (CE) receiver 122 outside the BIER-TE domain 102. Thus, the first CE 122 is configured to receive packets from, and send packets to, the network node 110 and the network node 118. The network node 118 is coupled to a second CE receiver 124 outside the BIER-TE domain 102. Thus, the second CE receiver 124 is configured to receive packets from, and send packets to, the network node 118.

FIG. 2 is a schematic diagram of an egress protection bit index forwarding table (EP-BIFT) 200 of a network node. Each of the network nodes 104-118 in the BIER-TE topology 100 in FIG. 1 generates an EP-BIFT 200. In an embodiment, the EP-BIFT is generated based on a bit index routing table (BIRT) or a bit index forwarding table (BIFT) (not shown) that the network nodes 104-118 built.

The EP-BIFT 200 depicted in FIG. 2 is the EP-BIFT 200 built on the network node 108 in FIG. 1. As shown, the EP-BIFT 200 includes six columns of information. The first column 202 includes the BP, SI, and bitstring of each adjacency directly coupled to the network node 108 in the BIER-TE topology 100. The adjacency in column 202 may be a forward connected adjacency to a destination network node (e.g., network node 118, network node 114, and network node 110) from network node 108 or a forward connected adjacency to a neighbor network node (e.g., network node 106) from network node 108. A second column 204 indicates the action to be taken by the network node 108, which in the illustrated example is a forward connected adjacency. A third column 206 identifies the neighbor node (BFR-NBR) of the network node 108 used to reach the adjacent network node identified by the adjacency in the first column 202, which is why the neighbor node in the third column 206 may also be referred to as the next hop of the network node 108. The first column 202, the second column 204, and the third column 206 in the EP-BIFT 200 may be utilized by the network node 108 during normal operations (i.e., when the primary egress node 110 as a neighbor node of the network node 108 is operating normally). That is, these columns are used when the entry in the backup entry active (BEA) field is set to zero.

The fourth column 218 includes a backup entry active (BEA) field. An entry in the BEA field is set to indicate whether the primary egress node is working or has failed. As an example, when an entry in the BEA field is set to a value of zero the primary egress node (e.g., network node 110) is properly functioning. However, when an entry in the BEA field is set to a value of one the primary egress node is not properly functioning (i.e., has failed). The fourth column 218, the fifth column 220, and the sixth column 222 in the EP-BIFT 200 may be utilized by the network node 108 during abnormal operations (i.e., when the primary egress node 110 is not operating normally or has failed). That is, these columns are used when the entry in the BEA field is set to one.

The fifth column 220 includes a same receiver (SC) field. An entry in the SC field indicates whether the primary egress node (e.g., network node 110) and the backup egress node (e.g., network node 118) transmit a payload of a packet to the same CE receiver (e.g., CE receiver 122) or to different CE receivers (e.g., CE receiver 122 and CE receiver 124). As an example, when an entry in the SC field is set to one, the primary egress node and the backup egress node send the payload of a packet to the same CE receiver. When the entry in the SC field is set to zero, the primary egress node and the backup egress node send a packet to different CE receivers.

The sixth column 222 includes a backup path field. An entry in the backup path field identifies the backup path used to reach the backup egress node for the primary egress node when the primary egress node is operating abnormally or has failed. As an example, the backup path field in the first row 208 of the EP-BIFT 200 includes the expression C→H:{10', 1}. This expression indicates that the backup path from network node 108 (a.k.a., network node C) to the backup egress network node 118 (a.k.a., network node H) is along forward connected adjacency 10' (i.e., the BP of the forward connected adjacency to the backup egress network node 110 from network node 108) and then local decapsulation adjacency 1 for primary egress node 110.

The backup path field in the second row 210 of the EP-BIFT 200 includes the expression C→E:{3', 2', 3}. This expression indicates that the backup path from network node 108 (a.k.a., network node C) to the backup egress network node 112 (a.k.a., network node E) is along forward connected adjacency 3' (i.e., the BP of the forward connected adjacency from network node 108 to an intermediate network node 106, a.k.a., network node B), along forward connected adjacency 2' (i.e., the BP of the forward connected adjacency from network node 106 to backup egress node 112), and then local decapsulation adjacency 3 for backup egress node 112. Unlike in row 208, the entry in the SC field of column 220 is set to one in row 210 to signify that the primary egress node and the backup egress node send the payload of a packet to the same CE receiver. Because backup egress node 112 and primary egress node 114 share the same CE receiver, the local decapsulation adjacency of 3 for the backup egress node 112 is used in the backup path instead of the local decapsulation adjacency of 2 for the primary egress node 114.

The backup path field in the third row 212 of the EP-BIFT 200 includes the expression C→D:{18', 4}. This expression indicates that the backup path from network node 108 (a.k.a., network node C) to the backup egress network node 110 (a.k.a., network node D) for the primary egress node 118 (a.k.a., network node H) is along forward connected adjacency 18' (i.e., the BP of the forward connected adjacency from network node 108 to the backup egress network node 110) and then local decapsulation adjacency 4 for primary egress node 118.

There is no backup path listed in the backup path field in the fourth row 214 of the EP-BIFT 200 because network node 106 (a.k.a., network node B) is not an egress node (i.e., a BFER). That is, the backup path field in the fourth row 214 of the EP-BIFT 200 contains a null entry or no entry at all.

FIG. 3 is a schematic diagram of an EP-BIFT 300 of a backup egress node according to an embodiment of the disclosure. The EP-BIFT 300 depicted in FIG. 3 is the EP-BIFT 300 built on the network node 118 in FIG. 1, which is the backup egress node for network node 110. As shown, the EP-BIFT 300 includes six columns of information. The first column 302 includes the BP of each adjacency of network node 118 in the BIER-TE topology 100. A second column 304 indicates the action to be taken by the network node 118, which in the illustrated example is a forward connected adjacency, a local decapsulation, or no operation (nop) depending on which row is implicated. As used herein, no operation means that there is no operation of forwarding for the BP in the packet received. A third column 306 identifies the BFR-NBR (a.k.a., next hop) of the network node 118. The first column 302, the second column 304, and the third column 306 in the EP-BIFT 300 may be utilized by the network node 118 during normal operations. That is, these columns are used when the entry in the BEA field is set to zero.

The BEA field in the fourth column 308, the SC field in the fifth column 310, and the backup path field in the sixth column 312 in the EP-BIFT 300 are similar to the BEA field, the SC field, and the backup path field in EP-BIFT 200. Therefore, a full discussion of those fields is not repeated. The fourth column 308, the fifth column 310, and the sixth column 312 in the EP-BIFT 300 may be utilized by the network node 118 during abnormal operations (i.e., when the primary egress node 110 is not operating normally or has failed). That is, these columns are used when the entry in the BEA field is set to one.

When the entry in the BEA field of the EP-BIFT 300 is set to zero or the entry in the SC field of the EP-BIFT 300 is set to one, the network node H uses the entries in the first row 314, the second row 316, and the third row 318 of the first column 302, the second column 304, and the third column 306 to route packets. Indeed, the entries in the first row 314, the second row 316, and the third row 318 of the first column 302, the second column 304, and the third column 306 are the same as a normal BIFT without egress protection that would be used by network node H.

When the network node 118 detects the failure of the primary egress node D (e.g., the destination node with BP, SI, and bitstring of 1 (0:00001)), the network node 118 sets the value in the BEA field of the fourth row 320 to one and uses the entries in the fourth column 308, fifth column 310, and six column 312 of the fourth row 320 in the EP-BIFT 300 to route packets with BP 1 for primary egress node D. In that regard, the network node 118 transmits a payload of a packet with the network node D as the destination to CE1 receiver.

Notably, one or more of the network nodes described herein may detect the failure of a neighbor network node using, for example, bidirectional forwarding detection (BFD). A network node that is not directly coupled to, or immediately adjacent to, another node may detect a failure in the other network node using, for example, multi-hop BFD.

Figure 4:
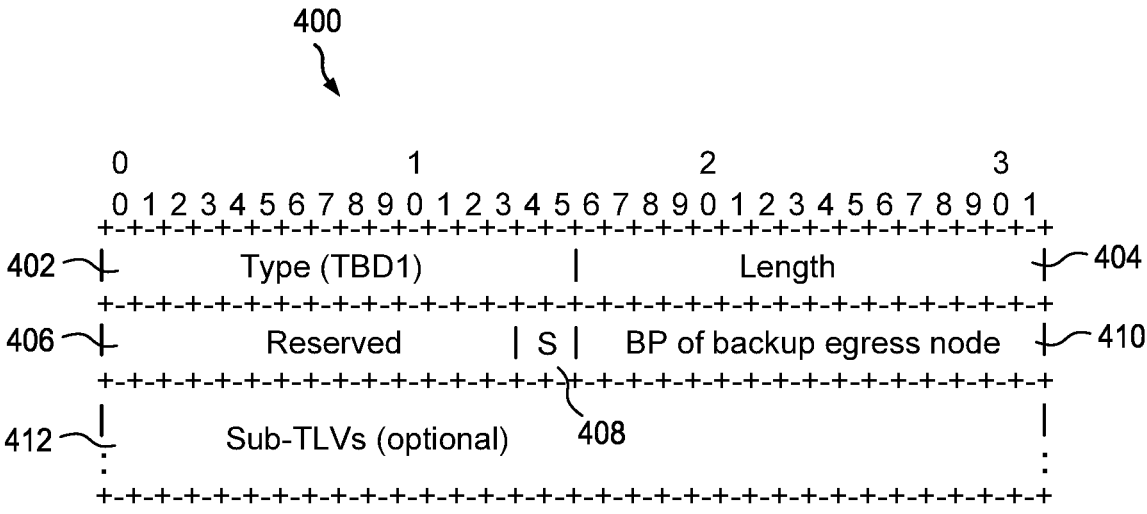
FIG. 4 is an open shortest path first (OSPF) type length value (TLV) structure according to an embodiment of the disclosure.

FIG. 4 is an OSPF TLV structure 400 according to an embodiment of the disclosure. In an embodiment, the OSPF TLV structure 400 is originated and transmitted by primary egress node (e.g., network node 110) to another network node (e.g., network node 108). The OSPF TLV structure 400 may be used to build an EP-BIFT as discussed herein.

As shown, the OSPF TLV structure 400 includes a type field 402, a length field 404, a reserved field 406, an S field 408, a BP of backup egress node field 410, and an optional sub-TLVs field 412. The type field 402 is two octets and is configured to include a value (a.k.a., entry) yet to be assigned by the Internet Assigned Numbers Authority (IANA). The length field 404 is two octets and is configured to include a value indicating the length of the TLV structure excluding the type field and length field. In an embodiment, the value is four when no sub-TLVs are included in the sub-TLVs field 412, and four plus the length of the sub-TLVs when sub-TLVs are included in the sub-TLVs field 412.

The reserved field 406 is fifteen bits. In an embodiment, the reserve field 406 is populated with all zeros when the OSPF TLV structure 400 is transmitted and will be ignored when the OSPF TLV structure 400 is received.

The S field 408 is one bit (a.k.a., a one bit flag). The flag is set to one to indicate that the primary egress node and the backup egress node transmit a payload of a packet to the same CE receiver (e.g., CE receiver 122). The flag is set to zero to indicate that the primary egress node and the backup egress node transmit the payload of the packet to different CE receivers (e.g., CE receiver 122 and CE receiver 124).

The BP of backup egress node field 410 is two octets. The value in the BP of backup egress node field 410 is the BP of the backup egress node configured to protect against the failure of the primary egress node (i.e., the node originating the OSPF TLV structure 400). That is, the value in the BP of backup egress node field 410 identifies the backup egress node.

Figure 5:
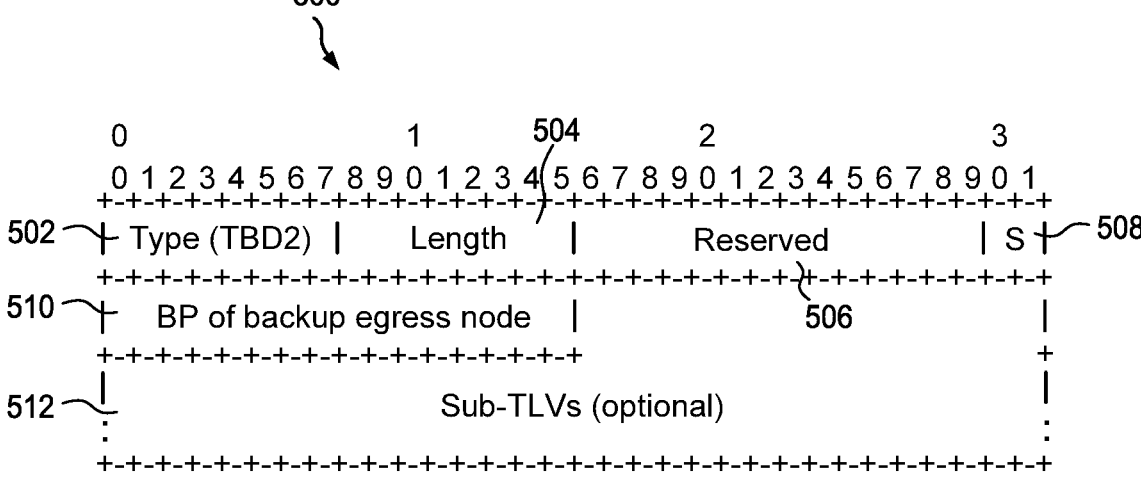
FIG. 5 is an *intermedia* system—intermediate system (IS-IS) type length value (TLV) structure according to an embodiment of the disclosure.

FIG. 5 is an IS-IS TLV structure 500 according to an embodiment of the disclosure. In an embodiment, the IS-IS TLV structure 500 is originated and transmitted by primary egress node (e.g., network node 110) to another network node (e.g., network node 108). The IS-IS TLV structure 500 may be used to build an EP-BIFT as discussed herein.

As shown, the IS-IS TLV structure 500 includes a type field 502, a length field 504, a reserved field 506, an S field 508, a BP of backup egress node field 510, and an optional sub-TLVs field 512. The type field 502 is one octet and is configured to include a value yet to be assigned by the IANA. The length field 504 is one octet and is configured to include a value indicating the length of the TLV structure excluding the type field and length field. In an embodiment, the value is four when no sub-TLVs are included in the sub-TLVs field 512, and four plus the length of the sub-TLVs when sub-TLVs are included in the sub-TLVs field 512.

The reserved field 506 is fifteen bits. In an embodiment, the reserve field 506 is populated with all zeros when the IS-IS TLV structure 500 is transmitted and will be ignored when the IS-IS TLV structure 500 is received.

The S field 508 is one bit (a.k.a., a one bit flag). The flag is set to one to indicate that the primary egress node and the backup egress node transmit a payload of a packet to the same CE receiver (e.g., CE receiver 122). The flag is set to zero to indicate that the primary egress node and the backup egress node transmit the payload of the packet to different CE receivers (e.g., CE receiver 122 and CE receiver 124).

The BP of backup egress node field 510 is two octets. The value in the BP of backup egress node field 510 is the BP of the backup egress node configured to protect against the failure of the primary egress node (i.e., the node originating the IS-IS TLV structure 500).

Keeping the above in mind and referring back to FIG. 1, an example of how packets are routed during normal operations and how packets are routed during a failure are provided. During normal operations, when a packet is received at network node 104, the network node 104 adds or encapsulates a path into the packet. For example, the network node 104 adds the path {7, 4', 18', 12', 2, 1}) into the received packet. Thereafter, the network node 104 removes adjacency 7' from the packet and transmits the packet to network node 106. The network node 106 receives the packet, which now contains the path {4', 18', 12', 2, 1}. The network node 106 removes its adjacency 4' from the packet and transmits the packet to network node 108.

The network node 108 receives the packet, which now contains the path {18', 12', 2, 1}. The network node 108 makes a first copy of the packet, removes the adjacencies 18' and 12' from the first copy, and sends the first copy to network node 110. The network node 108 also makes a second copy of the packet, removes the adjacencies 18' and 12' from the second copy, and sends the second copy to network node 114.

The network node 110 receives the packet with path {2, 1}, decapsulates the packet with BP=1 for egress node 110, and sends the payload of the packet to the multicast overlay, which sends the payload to the first CE receiver 122. The network node 114 receives the packet with path {2, 1}, decapsulates the packet with BP=2 for egress node 114, and sends the payload of the packet to the multicast overlay, which sends the payload to another CE receiver (not shown) in communication with the network node 114.

During abnormal operations (e.g., network node 110 has failed), when a packet is received at network node 104, the network node 104 adds or encapsulates a path into the packet. For example, the network node 104 adds the path {7', 4', 18', 12', 2, 1}) into the received packet. Thereafter, the network node 104 removes adjacency 7' from the packet and transmits the packet to network node 106. The network node 106 receives the packet, which now contains the path {4', 18', 12', 2, 1}. The network node 106 removes its adjacency 4' from the packet and transmits the packet to network node 108.

The network node 108 receives the packet, which now contains the path {18', 12', 2, 1}. Because the network node 108 has detected the failure of network node 110, the network node 108 makes a first copy of the packet and sets the value of BEA in the first row 208 of the EP-BIFT 200 to one. The network node 108 then uses the backup path indicated in the sixth column 222 of the first row 208 in transmitting the first copy of the packet. That is, the network node 108 removes the adjacencies 18' and 12' from the first copy and adds the BPs of the backup path into the first copy. Thereafter, the network node 108 sends the first copy to network node 118.

If, however, the value of the SC in the fifth column 220 of the first row 208 of the EP-BIFT 200 is instead set to one, then the backup path in the sixth column 22 would be C→H:{10', 4} instead of C→H:{10', 1}. In such a case, the network node 108 removes the adjacencies 18' and 12' from the first copy and adds the adjacency 10' into the first copy. The network node 108 also replaces the BP of 1 corresponding to the network node 110 in the first copy with the BP of 4 corresponding to the network node 118. Thereafter, the network node 108 sends the first copy to network node 118. The network node 108 also makes a second copy of the packet, removes the adjacencies 18' and 12' from the second copy, and sends the second copy to network node 114.

The network node 118 receives the packet, which now contains the path {2, 4}. The network node 118 uses the third row 318 of the EP-BIFT 300 to decapsulate the packet with BP=4 for the backup egress node 118 and transmits the payload of the packet to the multicast overlay, which sends the payload to the first CE receiver 122. If network node 118 as the backup egress node and network node 110 as the primary egress node send their packets' payloads to different CE receivers, the network node 108 sends a copy of the packet with path {2, 1} to network node 118 when the primary egress node 110 has failed. The network node 118 has detected the failure of the primary egress node 110 and set the entry in the BEA field 308 of the fourth row 320 to one in its EP-BIFT 300. The network node 118 receives the packet, which now contains the path {2, 1}. The network node 118 uses the fourth column 308, the fifth column 310 and the sixth column 312 in the fourth row 320 of the EP-BIFT 300 to decapsulate the packet with BP=1 for the primary egress node 110 and transmits the payload of the packet to the first CE receiver 122 (i.e., CE1).

FIG. 6 is an algorithm 600 used to implement a portion of the forwarding procedure using the EP-BIFT according to an embodiment of the disclosure. A first portion of the algorithm 600 is implemented on a point of local repair (PLR) while a second portion of the algorithm 600 is implemented on a backup egress network node.

On the PLR for a BFR-NBR N as egress encoded in a packet, if BEA=1 (i.e., the primary egress has failed and should be protected), then the PLR clears the BP for adjacency to N and the BP for BFER N. If the BP for N's backup egress B in the packet=0 or the SC=0, the PLR adds the BPs for the backup path into the bitstring of a packet copy and sends the packet copy to B along the backup path.

On the backup egress for a primary egress encoded in the packet, if BEA=1 (i.e., the primary egress has failed and should be protected), then the backup egress sends the payload of the packet to the CE receiver of the primary egress.

FIG. 7 is an algorithm 700 used to implement a portion of the forwarding procedure using the EP-BIFT according to an embodiment of the disclosure. In particular, the algorithm 700 may be used to clear a bit or add a bit in the bitstring of a packet as described above.

Upon receipt of a packet, for each BP k (from the right in the bitstring of the packet), if the BP k is the local decapsulation adjacency (i.e., the BP of the primary egress node) and the primary egress node has failed (BEA=1), the backup egress node sends the payload of the packet to the CE receiver of the primary egress node. Otherwise, the network node copies the packet, sends the copy to the multicast flow overlay, and clears bit k in the bitstring of the packet.

If BP k is the forward connected adjacency of the BFR (i.e., the network node), the network node finds the forwarding entry in the EP-BIFT for the BIER-TE domain using BP k. If the primary egress node has failed (BEA=1), the network node clears the BP k and the BP for the BFR-NBR in the bitstring of the packet. If the BP for the backup egress=0 or the SC=0, the network node adds BPs for the backup path to the backup egress into the bitstring of the packet. Otherwise, the network node copies the packet, updates the bitstring of the packet by clearing all the BPs for the adjacencies of the BFR (i.e., the network node), and sends the updated copy to the BFR-NBR.

FIG. 8 is a method 800 implemented by a network node (e.g., network node 108) in the BIER-TE domain according to an embodiment of the disclosure. The method may be performed by the network node to provide protection for an egress node.

In block 802, the network node receives a type length value (TLV) structure that includes a bit position of a backup egress node for a primary egress node. In an embodiment, the TLV structure is received from the primary egress node or a neighbor network node. In an embodiment, the TLV structure includes an entry that indicates whether the primary egress node and the backup egress node transmit the packet to a same customer edge (CE) receiver or to different CE receivers.

In block 804, the network node generates an egress protection bit index forwarding table (EP-BIFT) including the backup path to the backup egress node when the network node neighbors the primary egress node. The backup egress node is identified based on the bit position of the backup egress node. In an embodiment, the EP-BIFT includes an entry that indicates whether the primary egress node and the backup egress node transmit the packet to a same customer edge (CE) receiver or to different CE receivers, and wherein the entry is disposed in a same CE receiver (SC) field in the EP-BIFT. In an embodiment, the EP-BIFT includes a backup entry active (BEA) field, and wherein an entry in the BEA field is set to indicate whether the primary egress node is working or has failed.

In an embodiment, the backup egress node is identified in a backup path field in the EP-BIFT. In an embodiment, generating the EP-BIFT includes generating a backup path in a backup path field, wherein the backup path includes a bit position of a forward connected adjacency to an intermediate node along a path to the backup egress node and the bit position of the backup egress node (i.e., the local decap adjacency of the backup egress node) for the primary egress node when the primary egress node and the backup egress node transmit the packet to a same customer edge (CE) receiver. In an embodiment, generating the EP-BIFT includes generating a backup path in a backup path field, wherein the backup path includes a bit position of a forward connected adjacency to an intermediate node along a path to the backup egress node and a bit position of the primary egress node (i.e., the local decap adjacency of the primary egress node) when the primary egress node and the backup egress node transmit the packet to different customer edge (CE) receivers.

In block 806, the network node forwards a packet along the backup path when the primary egress node has failed.

Figure 9:
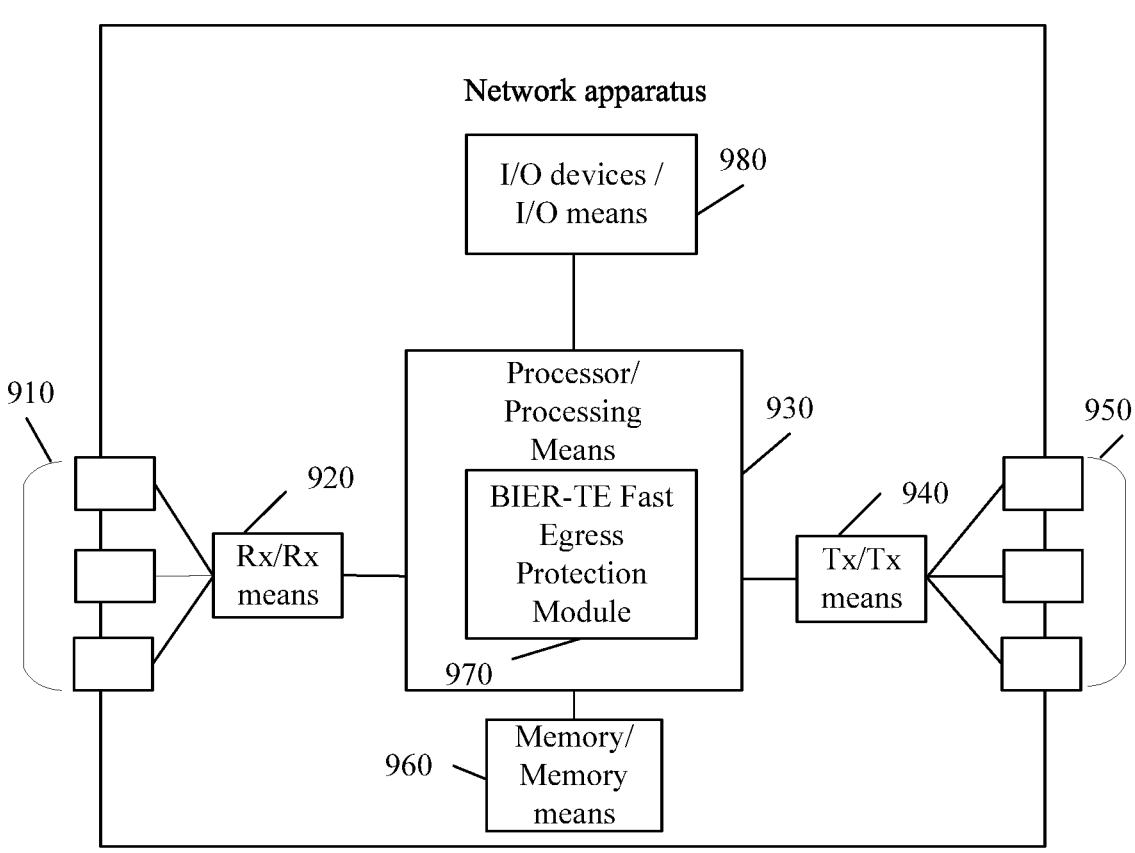
FIG. 9 is a schematic diagram of a network apparatus according to an embodiment of the disclosure.

FIG. 9 is a schematic diagram of a network apparatus 900 (e.g., a network node, a destination node, a neighbor node, etc.). The network apparatus 900 is suitable for implementing the disclosed embodiments as described herein. The network apparatus 900 comprises ingress ports/ingress means 910 and receiver units (Rx)/receiving means 920 for receiving data; a processor, logic unit, or central processing unit (CPU)/processing means 930 to process the data; transmitter units (Tx)/transmitting means 940 and egress ports/egress means 950 for transmitting the data; and a memory/memory means 960 for storing the data. The network apparatus 900 may also comprise optical-to-electrical (OE) components and electrical-to-optical (EO) components coupled to the ingress ports/ingress means 910, the receiver units/receiving means 920, the transmitter units/transmitting means 940, and the egress ports/egress means 950 for egress or ingress of optical or electrical signals.

The processor/processing means 930 is implemented by hardware and software. The processor/processing means 930 may be implemented as one or more CPU chips, cores (e.g., as a multi-core processor), field-programmable gate arrays (FPGAs), application specific integrated circuits (ASICs), and digital signal processors (DSPs). The processor/processing means 930 is in communication with the ingress ports/ingress means 910, receiver units/receiving means 920, transmitter units/transmitting means 940, egress ports/egress means 950, and memory/memory means 960. The processor/processing means 930 comprises a BIER-TE fast egress protection module 970. The BIER-TE fast egress protection module 970 is able to implement the methods disclosed herein. The inclusion of the BIER-TE fast egress protection module 970 therefore provides a substantial improvement to the functionality of the network apparatus 900 and effects a transformation of the network apparatus 900 to a different state. Alternatively, the BIER-TE fast egress protection module 970 is implemented as instructions stored in the memory/memory means 960 and executed by the processor/processing means 930.

The network apparatus 900 may also include input and/or output (I/O) devices or I/O means 980 for communicating data to and from a user. The I/O devices or I/O means 980 may include output devices such as a display for displaying video data, speakers for outputting audio data, etc. The I/O devices or I/O means 980 may also include input devices, such as a keyboard, mouse, trackball, etc., and/or corresponding interfaces for interacting with such output devices.

The memory/memory means 960 comprises one or more disks, tape drives, and solid-state drives and may be used as an over-flow data storage device, to store programs when such programs are selected for execution, and to store instructions and data that are read during program execution. The memory/memory means 960 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a network node in a Bit Index Explicit Replication Traffic Engineering (BIER-TE) domain, comprising:
    receiving a type length value (TLV) structure that includes a bit position of a backup egress node for a primary egress node;
    generating an egress protection bit index forwarding table (EP-BIFT) including a backup path to the backup egress node based on the bit position of the backup egress node when the network node neighbors the primary egress node; and
    forwarding a packet along the backup path when the primary egress node has failed,
    wherein the TLV structure includes an entry that indicates whether the primary egress node and the backup egress node transmit the packet to a same customer edge (CE) receiver or to different CE receivers.

2. The method of claim 1, wherein the TLV structure is received from the primary egress node or a neighbor network node.

3. The method of claim 1, wherein the EP-BIFT includes an entry that indicates whether the primary egress node and the backup egress node transmit the packet to a same customer edge (CE) receiver or to different CE receivers, and wherein the entry is disposed in a same CE receiver (SC) field in the EP-BIFT.

4. The method of claim 1, wherein the EP-BIFT includes a backup entry active (BEA) field, and wherein an entry in the BEA field is set to indicate whether the primary egress node is working or has failed.

5. The method of claim 1, wherein the backup egress node is identified in a backup path field in the EP-BIFT.

6. The method of claim 1, wherein generating the EP-BIFT includes generating the backup path in a backup path field, wherein the backup path includes a bit position of a forward connected adjacency to an intermediate node along the backup path to the backup egress node and the bit position of the backup egress node for the primary egress node when the primary egress node and the backup egress node transmit the packet to a same customer edge (CE) receiver.

7. The method of claim 1, wherein generating the EP-BIFT includes generating the backup path in a backup path field, wherein the backup path includes a bit position of a forward connected adjacency to an intermediate node along the backup path to the backup egress node and a bit position of the primary egress node when the primary egress node and the backup egress node transmit the packet to different customer edge (CE) receivers.

8. The method of claim 1, wherein the TLV structure is an open shortest path first (OSPF) backup egress TLV.

9. A network node in a Bit Index Explicit Replication Traffic Engineering (BIER-TE) domain, comprising:
a memory storing instructions; and
one or more processors coupled to the memory, wherein the one or more processors are configured to execute the instructions to cause the network node to:
receive a type length value (TLV) structure that includes a bit position of a backup egress node for a primary egress node;
generate an egress protection bit index forwarding table (EP-BIFT) including a backup path to the backup egress node based on the bit position of the backup egress node when the network node neighbors the primary egress node; and
forward a packet along the backup path when the primary egress node has failed,
wherein the TLV structure includes an entry that indicates whether the primary egress node and the backup egress node transmit the packet to a same customer edge (CE) receiver or to different CE receivers.

10. The network node of claim 9, wherein the TLV structure is received from the primary egress node or a neighbor network node.

11. The network node of claim 9, wherein the EP-BIFT includes an entry that indicates whether the primary egress node and the backup egress node transmit the packet to a same customer edge (CE) receiver or to different CE receivers, and wherein the entry is disposed in a same CE receiver (SC) field in the EP-BIFT.

12. The network node of claim 9, wherein the EP-BIFT includes a backup entry active (BEA) field, and wherein an entry in the BEA field is set to indicate whether the primary egress node is working or has failed.

13. The network node of claim 9, wherein the backup egress node is identified in a backup path field in the EP-BIFT.

14. The network node of claim 9, wherein generating the EP-BIFT includes generating the backup path in a backup path field, wherein the backup path includes a bit position of a forward connected adjacency to an intermediate node along the backup path to the backup egress node and the bit position of the backup egress node for the primary egress node when the primary egress node and the backup egress node transmit the packet to a same customer edge (CE) receiver.

15. The network node of claim 9, wherein generating the EP-BIFT includes generating the backup path in a backup path field, wherein the backup path includes a bit position of a forward connected adjacency to an intermediate node along the backup path to the backup egress node and a bit position of the primary egress node when the primary egress node and the backup egress node transmit the packet to different customer edge (CE) receivers.

16. The network node of claim 9, wherein the TLV structure is an open shortest path first (OSPF) backup egress TLV.

17. The network node of claim 9, wherein the TLV structure is an intermediate system-intermediate system (IS-IS) backup egress TLV.

18. A method implemented by a network node in a Bit Index Explicit Replication Traffic Engineering (BIER-TE) domain, comprising:
generating a type length value (TLV) structure, wherein the TLV structure includes a bit position of a backup egress node for a primary egress node; and
transmitting the TLV structure to a neighbor network node of the primary egress node,
wherein the TLV structure includes an entry that indicates whether the primary egress node and the backup egress node transmit a packet to a same customer edge (CE) receiver or to different CE receivers.

19. The method of claim 18, wherein the TLV structure is an open shortest path first (OSPF) backup egress TLV.

20. The method of claim 18, wherein the TLV structure is an intermediate system—intermediate system (IS-IS) backup egress TLV.

* * * * *